(12) United States Patent
Sugiyama et al.

(10) Patent No.: US 11,385,191 B2
(45) Date of Patent: Jul. 12, 2022

(54) IMAGE ACQUISITION SYSTEM AND IMAGE ACQUISITION METHOD

(71) Applicant: HAMAMATSU PHOTONICS K.K., Hamamatsu (JP)

(72) Inventors: Mototsugu Sugiyama, Hamamatsu (JP); Tatsuya Onishi, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 16/977,264

(22) PCT Filed: Jan. 10, 2019

(86) PCT No.: PCT/JP2019/000534
§ 371 (c)(1),
(2) Date: Sep. 1, 2020

(87) PCT Pub. No.: WO2019/171755
PCT Pub. Date: Sep. 12, 2019

(65) Prior Publication Data
US 2021/0003518 A1    Jan. 7, 2021

(30) Foreign Application Priority Data

Mar. 9, 2018    (JP) .............................. JP2018-043407

(51) Int. Cl.
*G01N 23/083*    (2018.01)
*G01N 23/04*    (2018.01)
*G01N 23/18*    (2018.01)

(52) U.S. Cl.
CPC ........... *G01N 23/083* (2013.01); *G01N 23/04* (2013.01); *G01N 23/18* (2013.01); *G01N 2223/505* (2013.01)

(58) Field of Classification Search
CPC ...... G01N 23/04; G01N 23/083; G01N 23/18; G01N 2223/505
See application file for complete search history.

(56) References Cited

U.S. PATENT DOCUMENTS 4,383,327 A * 5/1983 Kruger .................. G01N 23/04
378/19
5,351,278 A * 9/1994 Koshishiba .......... G01N 23/046
378/22

(Continued)

FOREIGN PATENT DOCUMENTS

JP    H11-248648 A    9/1999
JP    2012-154734 A    8/2012

(Continued)

OTHER PUBLICATIONS

International Preliminary Report o Patentability dated Sep. 24, 2020 for PCT/JP2019/000534.

(Continued)

*Primary Examiner* — Blake C Riddick
(74) *Attorney, Agent, or Firm* — Faegre Drinker Biddle & Reath LLP

(57) ABSTRACT

An image acquisition system includes a radiation source configured to output radiation toward an object, a rotating stage configured to rotate the object around a rotation axis, a radiation camera having an input surface to which the radiation transmitted through the object is input and an image sensor capable of TDI control, and an image processing apparatus configured to generate a radiographic image of the object at an imaging plane P based on the image data. The angle formed between the rotation axis of the rotating stage and the input surface of the radiation camera is set in accordance with the FOD which is the distance between the radiation source and an imaging plane in the object. The radiation camera is configured to perform TDI control in the (Continued)

image sensor in synchronization with the rotational speed of the object rotated by the rotating stage.

16 Claims, 15 Drawing Sheets

(56) References Cited

U.S. PATENT DOCUMENTS

| | | | | |
|---|---|---|---|---|
| 5,949,811 | A * | 9/1999 | Baba | A61B 6/542 378/108 |
| 6,324,249 | B1 * | 11/2001 | Fazzio | G01N 23/044 378/22 |
| 2005/0226369 | A1 * | 10/2005 | Martin | A61B 6/466 378/22 |
| 2005/0265515 | A1 * | 12/2005 | Tashiro | A61B 6/032 378/20 |
| 2009/0296880 | A1 * | 12/2009 | Beets | A61B 6/4441 378/14 |
| 2014/0064458 | A1 * | 3/2014 | Jobst | G01T 7/005 378/207 |
| 2014/0169522 | A1 * | 6/2014 | Hoshino | A61B 6/484 378/36 |
| 2015/0004558 | A1 * | 1/2015 | Inglese | A61B 6/4233 433/29 |
| 2015/0160354 | A1 | 6/2015 | Mertens et al. | |
| 2015/0182175 | A1 * | 7/2015 | Handa | A61B 6/032 378/9 |
| 2015/0323685 | A1 * | 11/2015 | Nelson | G01T 1/1614 250/370.08 |
| 2016/0019701 | A1 * | 1/2016 | Visser | A61B 6/542 378/19 |
| 2016/0047759 | A1 * | 2/2016 | Wang | G06T 3/4069 378/11 |
| 2016/0054239 | A1 * | 2/2016 | Schlecht | G01N 23/046 378/11 |
| 2017/0311910 | A1 * | 11/2017 | Inglese | G01T 1/24 |
| 2018/0035968 | A1 * | 2/2018 | Yamahana | A61B 6/541 |
| 2018/0146937 | A1 * | 5/2018 | Nariyuki | A61B 6/467 |
| 2018/0202947 | A1 * | 7/2018 | Urano | G01N 23/10 |
| 2019/0122782 | A1 * | 4/2019 | Pina | G21K 1/025 |
| 2020/0367838 | A1 * | 11/2020 | Funaki | A61B 6/102 |

FOREIGN PATENT DOCUMENTS

| | | |
|---|---|---|
| JP | 2012-154735 A | 8/2012 |
| JP | 2013-098420 A | 5/2013 |
| JP | 2013-098853 A | 5/2013 |
| JP | 2013-174545 A | 9/2013 |
| JP | 2014-021015 A | 2/2014 |
| JP | 2015-206773 A | 11/2015 |
| JP | 2017-053778 A | 3/2017 |
| KR | 10-1318826 B1 | 10/2013 |
| KR | 101318826 B1 * | 10/2013 |
| WO | WO-2017/043123 A1 | 3/2017 |

OTHER PUBLICATIONS

Davis G. R. et al., "X-ray microtomography scanner using time-delay integration for elimination of ring artefacts in the reconstructed image", Nuclear Instruments & Methods in Physics Research. Section A, Elsevier BV North-Holland, NL, vol. 394, No. 1-2, Jul. 11, 1997, p. 157-p. 162, XP004086261.

Nowak Tristan et al., "Time-delayed summation as a means of improving resolution on fast rotating computed tomography systems", Medical Physics, AIP, Melville, NY, US, vol. 39, No. 4, Apr. 3, 2012, p. 2249-p. 2260, XP012160977.

* cited by examiner

IMAGE ACQUISITION SYSTEM AND IMAGE ACQUISITION METHOD

TECHNICAL FIELD

The present disclosure relates to an image acquisition system and an image acquisition method.

BACKGROUND ART

Conventionally, there is known an apparatus that irradiates a conveyed object with X-rays, detects the X-rays transmitted through the object, and performs TDI (time delay integration) control, thereby acquiring an X-ray image of the object (see Patent Documents 1 and 2). The apparatus disclosed in Patent Document 1 is configured to convey an object by means of a belt conveyor. An X-ray sensor is configured such that a plurality of element rows each having a plurality of detection elements arranged in a direction orthogonal to the conveying direction are arranged in the conveying direction. The apparatus disclosed in Patent Document 2 is configured to rotate a container containing a sample (object) while moving the container in the X direction. A TDI camera performs image capturing in synchronization with the conveying speed of a sample. The angular speed of the container is set to be equal to the ratio between the moving speed in the TDI direction and the distance from the focus of an X-ray source to the rotation center.

CITATION LIST

Patent Literature

Patent Document 1: Japanese Unexamined Patent Publication No. 2013-174545
Patent Document 2: Japanese Unexamined Patent Publication No. 2017-53778

SUMMARY OF INVENTION

Technical Problem

In the present disclosure, an apparatus that irradiates an object rotated about the rotation axis with radiation and acquires a radiographic image by using a camera capable of TDI control is considered. In this apparatus, the rotation axis intersects with the light receiving surface of the sensor of the camera (or its extended plane). The speed of the inner peripheral portion of an object is different from that of the outer peripheral portion of the object. When TDI control is performed based on the speed of the inner peripheral portion, the acquired radiographic image may be blurred at an outer peripheral portion. That is, when TDI control is performed based on the speed of a given portion of the object in the radial direction, the acquired radiographic image may be blurred at other portions. As described above, speed (peripheral speed) differences due to differences in radius make it difficult to acquire sharp radiographic images by TDI control.

The present disclosure describes an image acquisition system and an image acquisition method which can acquire sharp radiographic images of any portions of an object in the radial direction.

Solution to Problem

An image acquisition system according to one aspect of the present disclosure includes a radiation source configured to output radiation toward an object, a rotating stage configured to rotate the object around the rotation axis, a radiation camera having an input surface to which the radiation transmitted through the object is input and an image sensor capable of TDI (time delay integration) control and configured to capture an image of the input radiation and output image data, and an image processing apparatus configured to generate a radiographic image of the object at an imaging plane based on the image data. The angle formed between the rotation axis of the rotating stage and the input surface of the radiation camera is an acute angle and is set in accordance with the FOD which is the distance between the radiation source and an imaging plane in the object. The radiation camera is configured to perform TDI control in the image sensor in synchronization with the rotational speed of the object rotated by the rotating stage.

An image acquisition method according to another aspect of the present disclosure includes a step (rotation step) of rotating an object around a rotation axis at a predetermined speed by using a rotating stage, a step (radiation output step) of outputting radiation from a radiation source toward the rotating object, a step (radiation image capturing step) of capturing an image of the input radiation and outputting image data by using a radiation camera having an input surface to which the radiation transmitted through the object is input and an image sensor capable of TDI (time delay integration) control, and a step (image generation step) of generating a radiographic image of the object at an imaging plane based on the image data. The angle formed between the rotation axis of the rotating stage and the input surface of the radiation camera is an acute angle and is set in accordance with the FOD which is the distance between the radiation source and an imaging plane in the object. In the step of outputting image data, TDI control in the image sensor is performed in synchronization with the rotational speed of the object rotated by the rotating stage.

According to the image acquisition system and the image acquisition method described above, TDI control in the image sensor is performed in synchronization with the rotational speed of an object rotated by the rotating stage. The speed of an inner peripheral portion (a portion nearest to the rotation axis) of an imaging plane of the object is lower than that of an outer peripheral portion (a portion farthest from the rotation axis). An acute angle is formed between the rotation axis of the rotating stage and the input surface of the radiation camera. The distance between the radiation source and the input surface to which the radiation transmitted through the inner peripheral portion is input is longer than the distance between the radiation source and the input surface to which the radiation transmitted through the outer peripheral portion is input. This indicates that the enlargement factor at the inner peripheral portion is larger than that at the outer peripheral portion. A conveying speed suitable for a predetermined line speed in TDI control is inversely proportional to the enlargement factor. According to the magnitude relationship between the enlargement factors described above, the influence of the speed difference between the inner peripheral portion and the outer peripheral portion is reduced. In addition, the angle formed between the rotation axis of the rotating stage and the input surface of the radiation camera is set in accordance with the FOD which is the distance between the radiation source and an imaging plane in an object to make the ratio between the enlargement factors become the reciprocal of the speed ratio, thereby achieving focus on the inner peripheral portion and the outer peripheral portion. This makes it possible to achieve focus on any portion between the inner peripheral portion and the outer peripheral portion. It is therefore possible to acquire sharp radiographic images of any portions of the object in the radial direction.

According to some aspects, the image acquisition system further includes a stage movement control unit configured to bring the object closer to or move it further from the radiation source by controlling movement of the rotating stage in the rotation axis direction. The stage movement control unit can adjust the distance between the radiation source and the object. In other words, an imaging plane based on the above FOD can be set at an arbitrary position in the object in the rotation axis direction (i.e., the thickness direction). In this case, if the radiation source is immovable, the FOD can be considered constant. It is possible to acquire a radiographic image at an arbitrary position in the object in the thickness direction.

According to some aspects, the image acquisition system further includes an angle adjusting unit configured to hold the rotating stage or the radiation camera and adjust an angle formed between the rotation axis of the rotating stage and the input surface of the radiation camera. In this case, the angle adjusting unit can adjust the angle formed between the rotation axis of the rotating stage and the input surface of the radiation camera to a proper angle in accordance with the FOD.

According to some aspects of the image acquisition system, the angle adjusting unit is configured to adjust an angle formed between the rotation axis of the rotating stage and the input surface of the radiation camera in accordance with an FOD which is a distance between the radiation source and an imaging plane in the object. In this case, focus can be achieved with respect to an arbitrary FOD.

According to some aspects of the image acquisition system, the angle adjusting unit holds the radiation camera so as to tilt the input surface of the radiation camera with respect to the rotation axis. In this case, the angle formed between the rotation axis of the rotating stage and the input surface of the radiation camera can be adjusted to a proper angle in accordance with the FOD by adjusting the posture of the radiation camera.

According to some aspects of the image acquisition system, the angle adjusting unit holds the rotating stage so as to tilt the rotation axis with respect to the input surface of the radiation camera. In this case, the angle formed between the rotation axis of the rotating stage and the input surface of the radiation camera can be adjusted to a proper angle in accordance with the FOD by adjusting the posture of the rotating stage.

According to some aspects of the image acquisition system, the radiation camera includes a scintillator having an input surface, and the image sensor captures an image of scintillation light generated by the scintillator in accordance with input of the radiation. In this case, a sharp radiographic image of the object can be acquired.

According to some aspects of the image acquisition system, the image sensor is a direct conversion type radiation image sensor having the input surface. In this case, a sharp radiographic image of the object can be acquired.

According to some aspects, the image acquisition method further includes a step (movement step) of bringing the object closer to or moving it further from the radiation source by controlling movement of the rotating stage in the rotation axis direction. This step enables adjustment of the distance between the radiation source and the object. In other words, an imaging plane based on the above FOD can be set at an arbitrary position in the rotation axis direction (i.e., the thickness direction) of the object. In this case, if the radiation source is immovable, the FOD can be considered constant. It is possible to acquire a radiographic image at an arbitrary position in the thickness direction of the object.

According to some aspects, the image acquisition method further includes a step (adjusting step) of adjusting an angle between the rotation axis of the rotating stage and the input surface of the radiation camera by causing the rotating stage or the radiation camera to pivot. In this case, the step of adjusting the angle enables adjustment of the angle formed between the rotation axis of the rotating stage and the input surface of the radiation camera to a proper angle in accordance with the FOD.

According to some aspects of the image acquisition method, in the adjusting step, an angle formed between the rotation axis of the rotating stage and the input surface of the radiation camera is adjusted in accordance with an FOD which is a distance between the radiation source and an imaging plane in the object. In this case, focus can be achieved with respect to an arbitrary FOD.

According to some aspects of the image acquisition method, in the adjusting step, the radiation camera is caused to pivot to tilt the input surface of the radiation camera with respect to the rotation axis. In this case, the angle formed between the rotation axis of the rotating stage and the input surface of the radiation camera can be adjusted to a proper angle in accordance with the FOD by adjusting the posture of the radiation camera.

According to some aspects of the image acquisition method, in the adjusting step, the rotating stage is caused to pivot to tilt the rotation axis with respect to the input surface of the radiation camera. In this case, the angle formed between the rotation axis of the rotating stage and the input surface of the radiation camera can be adjusted to a proper angle in accordance with the FOD by adjusting the posture of the rotating stage.

According to some aspects of the image acquisition method, the radiation camera includes a scintillator having the input surface, and in the radiation image capturing step, an image of scintillation light generated by the scintillator in accordance with input of the radiation is captured. In this case, a sharp radiographic image of the object can be acquired.

According to some aspects of the image acquisition method, the image sensor is a direct conversion type radiation image sensor having the input surface. In this case, a sharp radiographic image of the object can be acquired.

Advantageous Effects of Invention

According to some aspects of the present disclosure, it is possible to acquire sharp radiographic images of any portions of an object in the radial direction.

DESCRIPTION OF EMBODIMENTS

Figure 1:
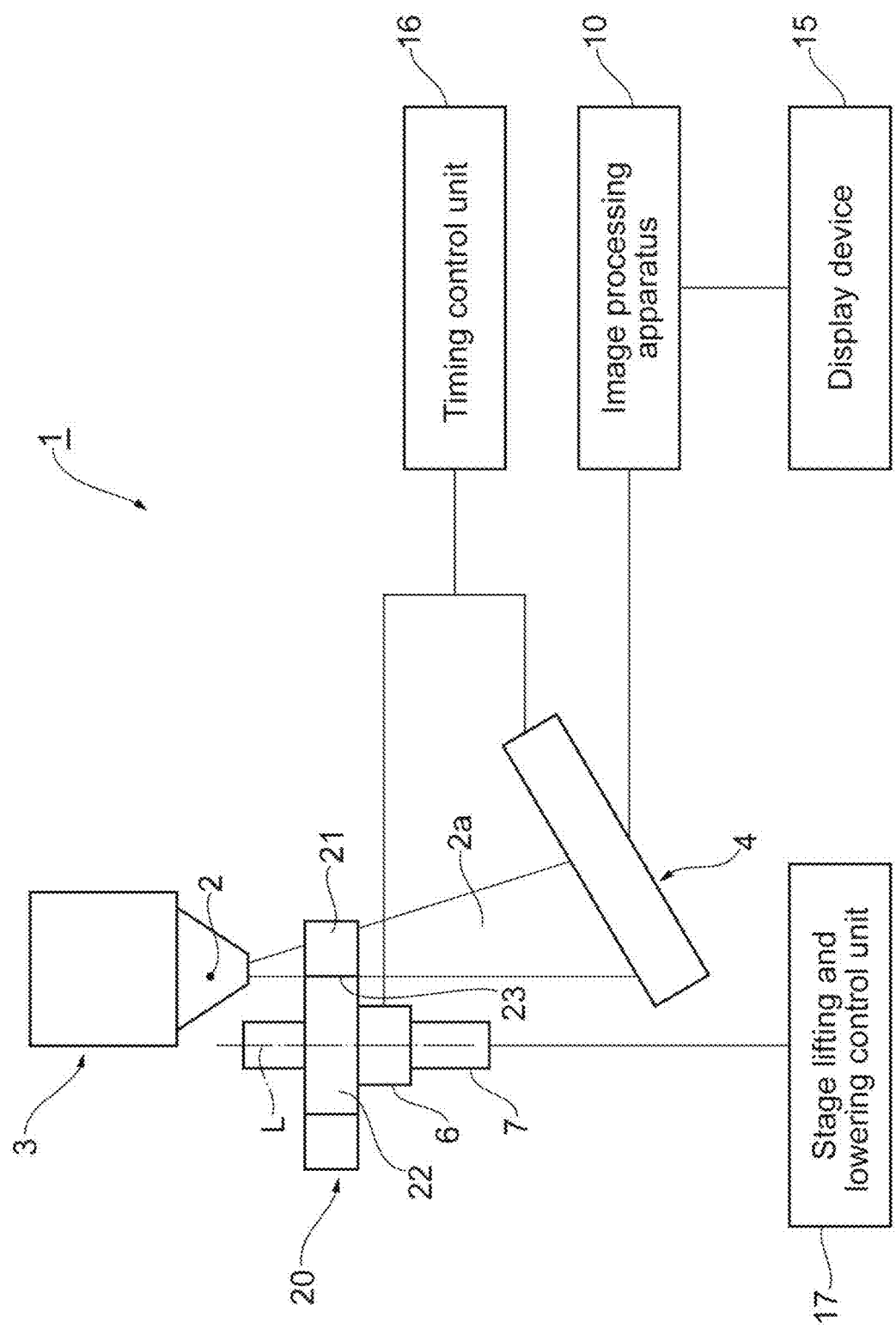
FIG. 1 is a view showing the schematic arrangement of an image acquisition apparatus according to the first embodiment of the present disclosure.

Hereinafter, embodiments of the present disclosure will be described below with reference to the accompanying drawings. Note that the same reference signs denote the same elements in the description of the drawings, and any overlapping description will be omitted. Also, the respective drawings are prepared for the purpose of description, and are drawn so that the portions to be described are especially emphasized. Therefore, the dimensional ratios of respective members in the drawings are not always coincident with actual ratios.

Figure 2:
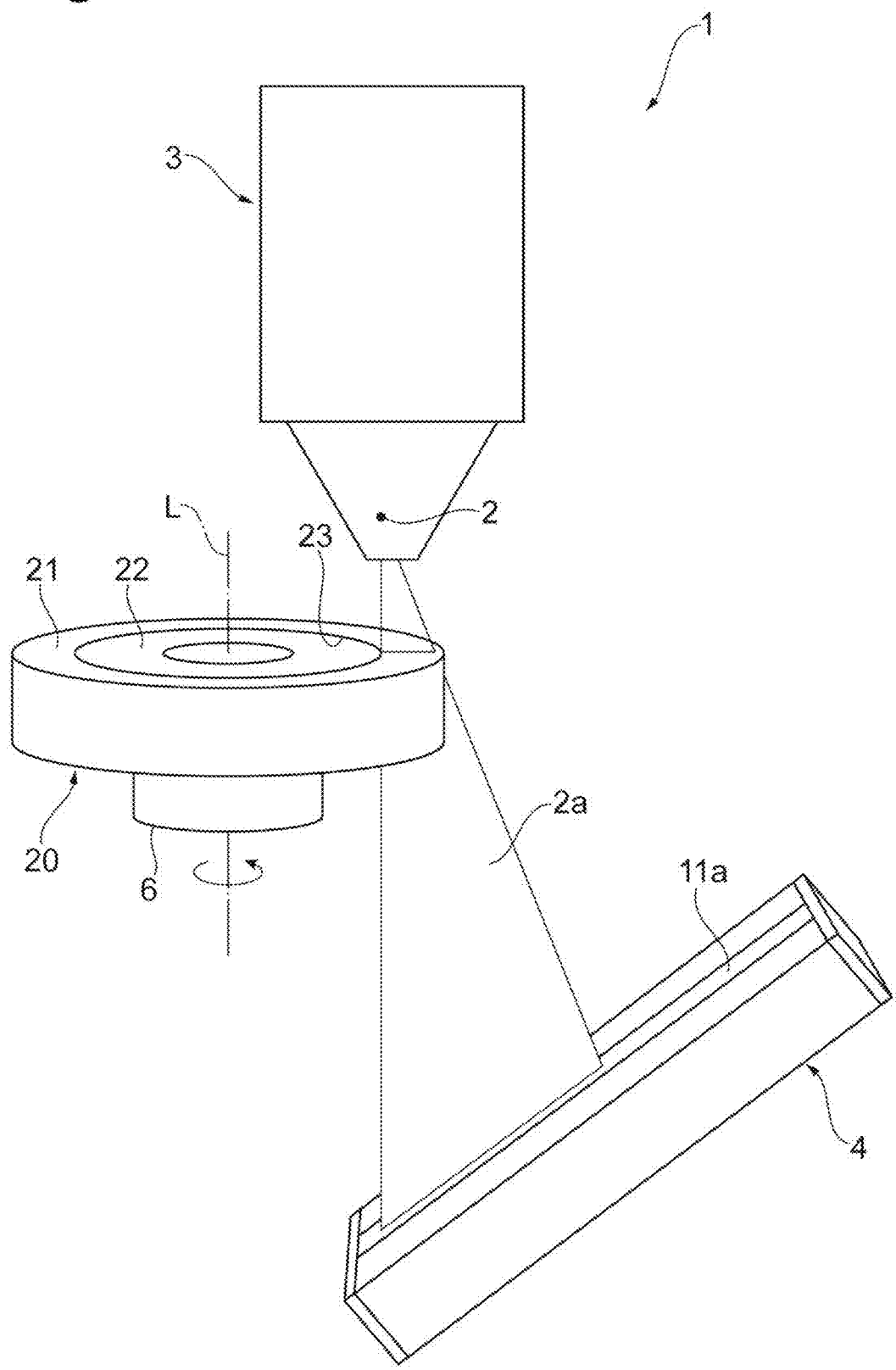
FIG. 2 is a view for explaining the positional relationship between a radiation source, an object, and a radiation camera in the image acquisition apparatus in FIG. 1.

As shown in FIGS. 1 and 2, an image acquisition system 1 is an apparatus for acquiring a radiographic image of an object 20. The image acquisition system 1 acquires a radiographic image of a given portion of the object 20 along, for example, the radial direction. The object 20 includes a cylindrical wheel portion 22 centered on, for example, a rotation axis L and a roll portion 21 wound around the wheel portion 22. An annular boundary surface 23 is formed between the wheel portion 22 and the roll portion 21. The image acquisition system 1 may be configured such that the wheel portion 22 is not included in a radiographic image. That is, the image acquisition system 1 may be configured to acquire a radiographic image of only the roll portion 21. The roll portion 21 is, for example, a chip capacitor wound in a roll shape. The roll portion 21 may be, for example, a separator wound in a roll shape. The object 20 may be, for example, one disk without the wheel portion 22. In this case, the object 20 has the rotation axis L. The shape and size of the object 20 are not specifically limited. The object 20 may be a circular object (cylindrical or disk-shaped object). Alternatively, the object 20 may be a non-circular object, which may be, for example, a box-shaped object having corners. The object 20 may be either an object having finiteness or a deformable object made of a soft material. When the image acquisition system 1 is used to inspect the object 20, the roll portion 21 is a portion to be inspected, i.e., an inspection portion.

The image acquisition system 1 acquires a radiographic image at an imaging plane located at a predetermined position in the thickness direction, i.e., the rotation axis L direction. In other words, the image acquisition system 1 acquires a radiographic image of a portion of the roll portion 21 at which an imaging plane is focused. The image acquisition system 1 can detect, for example, a foreign substance or defect that may exist in the roll portion 21 of the object 20 by acquiring a radiographic image. The image acquisition system 1 can detect, for example, an object made of polyamide fiber, polyolefin fiber, split type composite fiber, single fiber, or core-in-sheath type composite fiber and a foreign substance made of a metal that may exist in the object.

The image acquisition system 1 includes a radiation generator 3 that generates radiation such as white X-rays. The radiation generator 3 includes a radiation source 2 that outputs radiation toward the object 20. The radiation source 2 emits (outputs) cone beam X-rays from an X-ray emission portion. The radiation source 2 may be, for example, a microfocus X-ray source or millifocus X-ray source. The X-rays emitted from the radiation source 2 form a radiation flux 2a. A region where the radiation flux 2a exists is the emission region of the radiation source 2. The shape or structure of the X-ray emission portion may be devised such that the wheel portion 22 of the object 20 is not included in a radiographic image. The radiation source 2 is configured so as to be able to adjust a tube voltage and a tube current.

The image acquisition system 1 includes a rotating stage 6 configured to hold the object 20 and rotate the object 20 around the rotation axis L and a radiation camera 4 that receives and captures an image of radiation output from the radiation source 2 and transmitted through the object 20. The rotating stage 6 may include, for example, a motor driven by power feeding, a gear portion coupled to the motor, and a stage body rotated through the gear portion. The rotating stage 6 rotates, for example, the stage body at a constant speed. In other words, the rotating stage 6 (or its stage body) has the rotation axis L. The rotational speed of the rotating stage 6 can be adjusted as appropriate to the display device.

The radiation camera 4 includes, for example, an input surface 11a to which radiation transmitted through the object 20 is input, a scintillator 11 that generates scintillation light in accordance with the input of radiation, an FOP (fiber optic plate) 12 that transmits scintillation light generated by the scintillator 11, a light receiving surface 13a to which scintillation light transmitted through the FOP 12 is input, and an image sensor 13 that captures an image of scintillation light and outputs the image data. The radiation camera 4 is, for example, an indirect conversion type camera having the FOP 12 with the scintillator 11 coupled to the image sensor 13. The radiation camera 4 indirectly captures an image of radiation input to the input surface 11a of the scintillator 11 and outputs the image data.

The scintillator 11 is a wavelength conversion member having a plate shape (for example, a flat plate shape). The scintillator 11 converts radiation transmitted through the object 20 and input to the input surface 11a into scintillation light. Radiation having relatively low energy is converted on the input surface 11a side and exits (is output) from the input surface 11a. Radiation having relatively high energy is converted on the back surface of the scintillator 11 and exits (is output) from the back surface.

The FOP 12 is an optical device having a plate shape (for example, a flat plate shape). The FOP 12 is formed from, for example, glass fiber, and transfers scintillation light, etc., at high efficiency. The FOP 12 blocks radiation such as white X-rays.

The image sensor 13 is an area image sensor that can be TDI (time delay integration)-driven. The image sensor 13 is, for example, a CCD area image sensor. The image sensor 13 is configured such that a plurality of element rows each having a plurality of CCDs arranged in series in the pixel direction are arranged in the integration direction in accordance with the moving direction of the object 20. The integration direction is a direction orthogonal to the pixel direction and corresponds to a direction perpendicular to the drawing surface in FIGS. 1 to 3. A timing control unit 16 (to be described later) controls the image sensor 13 so as to perform charge transfer in accordance with the speed (peripheral speed) of the object 20. That is, the image sensor 13 performs charge transfer on the light receiving surface 13a in synchronization with the rotational speed of the object 20 rotated by the rotating stage 6. This makes it possible to obtain a radiographic image with a high S/N ratio.

Note that the image sensor 13 may be a CMOS area image sensor that can be TDI (time delay integration)-driven. Alternatively, the image sensor 13 may be a CCD-CMOS image sensor that can be TDI (time delay integration)-driven. For example, a CCD-CMOS image sensor is the image sensor disclosed in Japanese Unexamined Patent Publication No. 2013-098420 or 2013-098853. Note that "being able to be TDI-driven" is equivalent to "being able to be TDI-controlled."

The image acquisition system 1 includes an image processing apparatus 10 that generates a radiographic image of the object 20 at an imaging plane P based on image data output from the radiation camera 4, a display device 15 that displays the radiographic image generated by the image processing apparatus 10, and the timing control unit 16 that controls the image capturing timing of the radiation camera 4. In the image acquisition system 1, the radiation generator 3 is fixed to the radiation camera 4, and the object 20 rotates. The imaging plane P is, for example, a portion set at a predetermined position in or on the object 20 and is a region that is fixed and is immovable once set.

The image processing apparatus 10 is composed of, for example, a computer including a CPU (central processing unit), ROM (read only memory), RAM (random access memory), and input/output interface. The image processing apparatus 10 may include an image processing processor that generates a radiographic image of the object 20 based on the radiographic image data output from the radiation camera 4. The image processing processor, for example, inputs radiographic image data and executes predetermined processing such as image processing for the input radiographic image data. The image processing processor outputs the generated radiographic image.

As the display device 15, a known display can be used. Note that an input device (not shown) may be connected to the image processing apparatus 10. The input device can be, for example, a keyboard or mouse. The user can input various types of parameters such as the thickness of the object 20, the position of the boundary surface 23 at the object 20, and the position of the imaging plane P by using the input device.

The timing control unit 16 is composed of, for example, a computer including a CPU, ROM, RAM, and input/output interface. The timing control unit 16 may include a control processor that controls the image capturing timing of the radiation camera 4. The control processor controls the radiation camera 4 and the rotating stage 6 based on, for example, the thickness of the object 20, which is stored upon input, etc., by the user, and the position of the boundary surface 23 at the object 20 or the position of the imaging plane P. Note that the image processing apparatus 10 and the timing control unit 16 may be configured as programs executed by a single computer or configured as separate units.

The image acquisition system 1 further includes a stage lifting and lowering machine 7 for lifting and lowering the rotating stage 6 in the rotation axis L direction and a stage lifting and lowering control unit (stage movement control unit) 17 configured to control lifting and lowering (movement) of the rotating stage 6 of the stage lifting and lowering machine 7. As the stage lifting and lowering machine 7, a known lifting and lowering machine can be used. The stage lifting and lowering machine 7 may include, for example, a ball screw disposed on the rotation axis L and penetrating the rotating stage 6 and the object 20 and a motor (drive source). The stage lifting and lowering machine 7 is not limited to a screw-operated lifting and lowering machine and may be, for example, a telescoping lifting and lowering machine using a hydraulic source as a drive source.

The stage lifting and lowering control unit 17 is composed of, for example, a computer including a CPU, ROM, RAM, and input/output interface. The stage lifting and lowering control unit 17 may include a control processor that controls the movement of the rotating stage 6 in the rotation axis L direction. The control processor controls the stage lifting and lowering machine 7 based on, for example, the thickness of the object 20, which is stored upon input, etc., by the user, or the position of the imaging plane P. The stage lifting and lowering control unit 17 brings the object 20 closer to or moves it further from the radiation source 2 by controlling the stage lifting and lowering machine 7. That is, the stage lifting and lowering control unit 17 is configured to bring the object 20 closer to or move it further from the radiation source 2.

Each component of the image acquisition system 1 described above may be accommodated and fixed in a housing (not shown). Each component described above may be mounted on, for example, a base instead of being accommodated in the housing. All or at least one of the radiation source 2, the radiation camera 4, and the rotating stage 6 may be movable to allow the adjustment of the relative positional relationship between them. The image processing apparatus 10 may be accommodated in the housing or installed outside the housing. All or at least one of the image processing apparatus 10, the display device 15, the timing control unit 16, and the stage lifting and lowering control unit 17 may be installed in a place separated from the place where the radiation source 2, the radiation camera 4, and the rotating stage 6 are provided. The image processing apparatus 10, the timing control unit 16, and the stage lifting and lowering control unit 17 may perform control by remote control operations using wireless communication.

The placement and positional relationship of the radiation source 2, the rotating stage 6, and the radiation camera 4 will be described next. As shown in FIGS. 1 and 2, the rotating stage 6 is installed between, for example, the radiation source 2 and the radiation camera 4. More specifically, the rotating stage 6 is provided at a position where the rotation axis L of the rotating stage 6 passes through a side of the radiation source 2. This positions the boundary surface 23 of the object 20 immediately below the radiation source 2. In other words, the radiation generator 3 and the rotating stage 6 are arranged such that an extended plane of the boundary surface 23 (a cylindrical surface centered on the rotation axis L in this embodiment) passes through the radiation source 2. The emission region of the radiation source 2 includes or passes through the roll portion 21. The radiation camera 4 is disposed to cause radiation transmitted through the roll portion 21 of the object 20 to be input to the input surface 11a of the radiation camera 4 (see FIG. 2). In other words, the input surface 11a of the radiation camera 4 is provided so as to include a virtual plane including the radiation source 2 and the rotation axis L.

In this embodiment, the radiation camera 4 is installed to be tilted such that the input surface 11a forms an acute angle with respect to the rotation axis L of the rotating stage 6. This reduces the influence of the speed difference between inner and outer peripheral portions of the roll portion 21 in an obtained radiographic image (to be described in detail later). In this specification, the terms "inner periphery," "outer periphery," "radius," and "radial direction" are used with reference to the rotation axis L. Note that in this specification, the term "radial direction" or "radius" does not necessarily mean that the object 20 is circular. These terms should be understood as a concept of "a predetermined direction orthogonal to the rotation axis L or a line extending in the direction."

In this embodiment, the radiation camera 4 is tilted. In addition, the angle (the acute angle described above) formed between the rotation axis L and the input surface 11a of the radiation camera 4 is set in accordance with the FOD (focus-object distance) as the distance between the radiation source 2 and the imaging plane P in the object 20. This setting will be described in detail below with reference to FIGS. 3 and 4.

Figure 3:
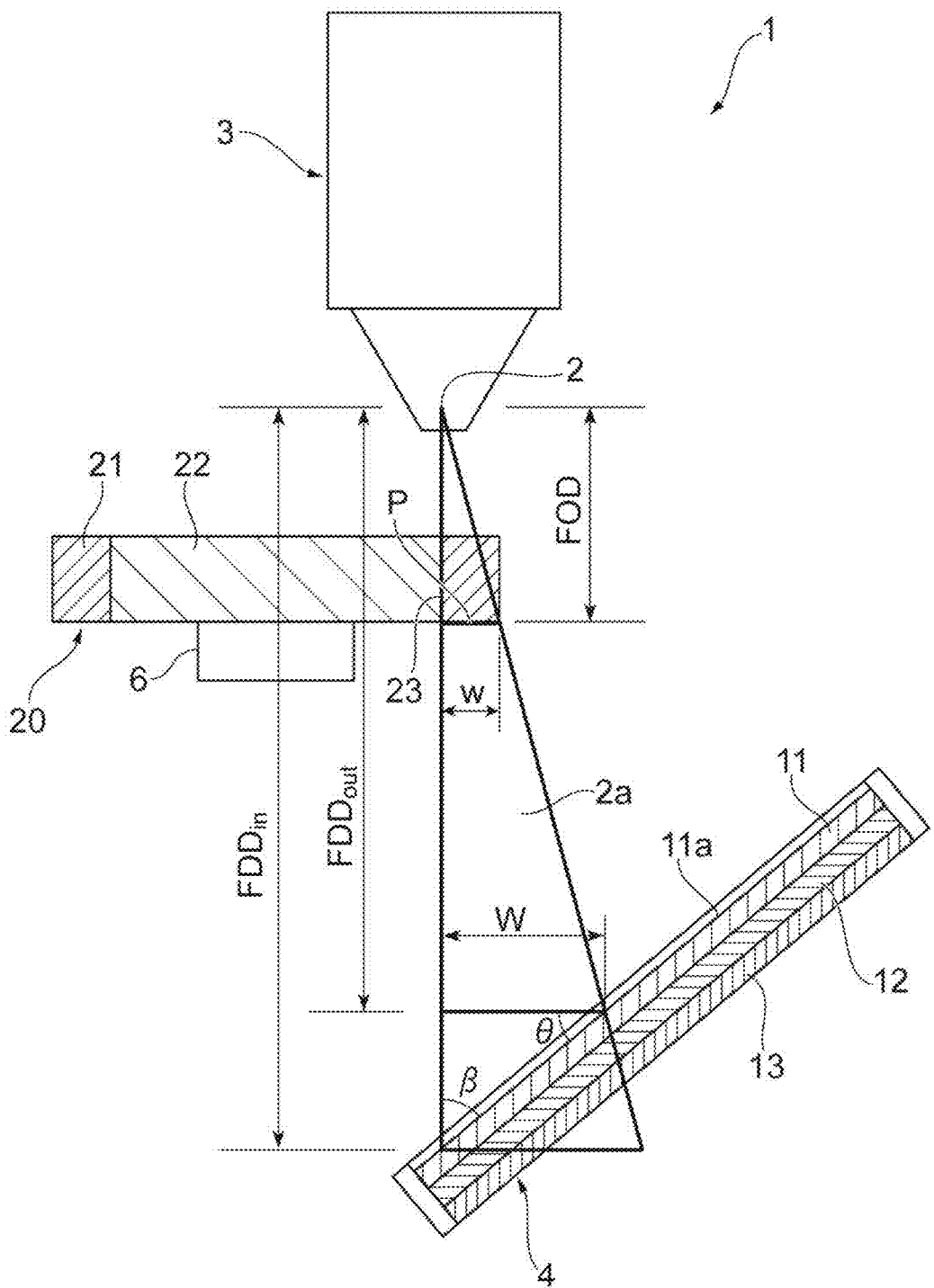
FIG. 3 is a view for explaining an FOR, an FDD, and the tilt of a radiation camera in the image acquisition apparatus in FIG. 1.
Figure 4:
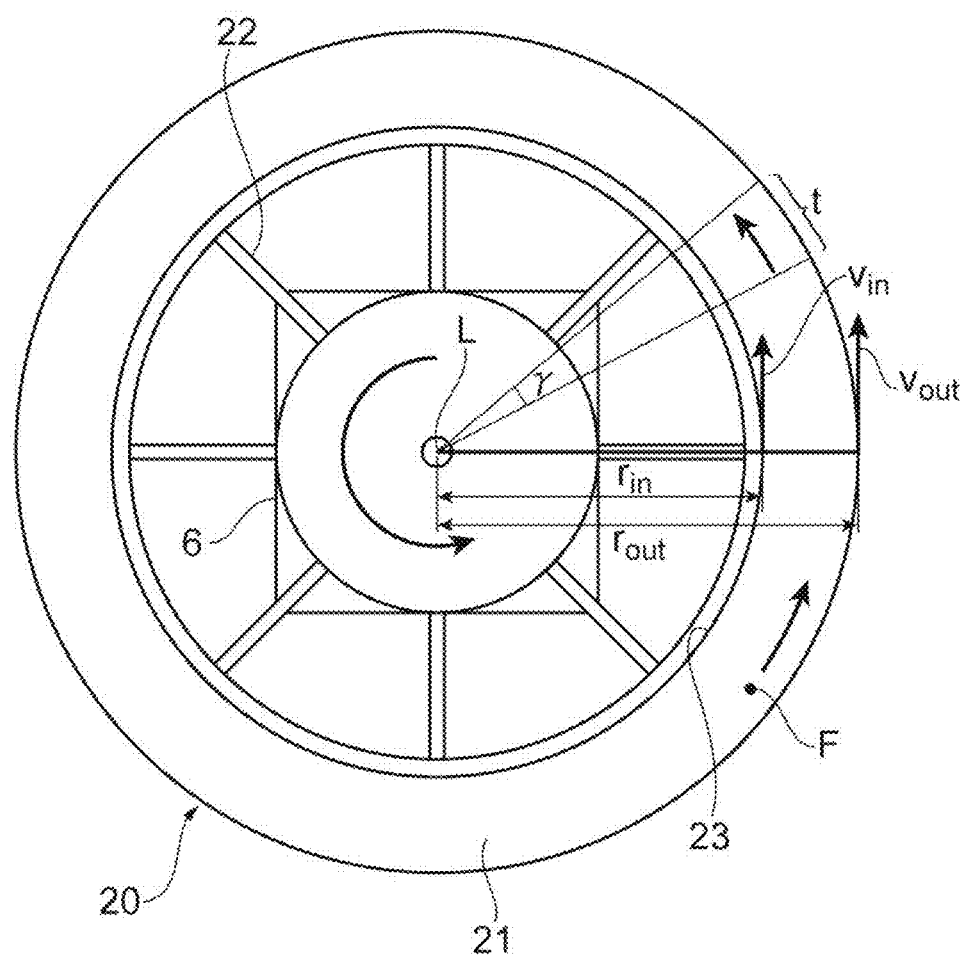
FIG. 4 is a view for explaining the speeds of the inner and outer peripheral portions of a rotating object.

The calculation of an $FDD_{out}$ at an outer peripheral portion and a tilt angle θ of the radiation camera 4 which are suitable for an $FDD_{in}$ on the inner peripheral side with reference to the $FDD_{in}$ will be described with reference to FIG. 3. In this case, the FDD (focus-detector distance) is the distance between the radiation source 2 and the input surface 11a of the radiation camera 4, and the suffixes "in" and "out" respectively indicate an "inner peripheral portion" and "outer peripheral portion." First, when the radiation camera 4 as a TDI camera is driven at an arbitrary line speed, a conveying speed corresponding to the line speed is inversely proportional to an X-ray geometric magnification (i.e., an enlargement factor). An enlargement factor $M_{in}$ at an inner peripheral portion and an enlargement factor $M_{out}$ at an outer peripheral portion are respectively represented by equations (1) and (2) given below.

[Numerical Formula 1]

$$M_{in} = \frac{FDD_{in}}{FOD} \tag{1}$$

[Numerical Formula 2]

$$M_{out} = \frac{FDD_{out}}{FOD} \tag{2}$$

In this case, if the relationship represented by equation (3) given below holds, both the inner peripheral portion and the outer peripheral portion come into focus.

[Numerical Formula 3]

$$\frac{v_{in}}{v_{out}} = \frac{M_{out}}{M_{in}} \tag{3}$$

Equation (5) is derived from equations (1), (2), and (3) and relational expression (4) (see FIG. 4) between an angular speed co and a speed v in the tangential direction.

[Numerical Formula 4]

$$\frac{v_{in}}{v_{out}} = \frac{r_{in}\omega}{r_{out}\omega} \tag{4}$$

[Numerical Formula 5]

$$\frac{r_{in}}{r_{out}} = \frac{FDD_{out}}{FDD_{in}} \tag{5}$$

Adjusting the FDD by tilting the radiation camera 4 so as to satisfy equation (5) will achieve focus on both the inner peripheral portion and the outer peripheral portion. Note that equation (4) is derived from equations (6) and (7) (see also FIG. 4) given below. The FOD can be adjusted by changing the ratio between the line speed of the radiation camera 4 and the rotational speed of the rotating stage 6.

[Numerical Formula 6]

$$\omega = \frac{\theta}{t} \text{ [rad/s]} \tag{6}$$

[Numerical Formula 7]

$$v = r\omega \text{ [m/s]} \tag{7}$$

Subsequently, when a winding thickness w of the roll is determined according to equation (8), the $FDD_{out}$ at the outer peripheral portion and the tilt angle θ of the radiation camera 4 suitable for the $FDD_{in}$ at the inner peripheral portion are calculated with reference to the $FDD_{in}$ according to equations (9) to (11). Note that the tilt angle θ can be the angle formed between a plane perpendicular to the rotation axis L and the input surface 11a of the radiation camera 4.

[Numerical Formula 8]

$$w = r_{out} - r_{in} \tag{8}$$

[Numerical Formula 9]

$$\frac{r_{in}}{r_{out}} = \frac{M_{out}}{M_{in}} = \frac{FDD_{out}}{FDD_{in}} \tag{9}$$

[Numerical Formula 10]

$$FDD_{out} = \frac{r_{in}}{r_{out}} FDD_{in} \tag{10}$$

-continued

[Numerical Formula 11]

$$\theta = \tan^{-1} \frac{FDD_{in} - FDD_{out}}{w \frac{FDD_{out}}{FOD}} = \tag{11}$$

$$\tan^{-1} \frac{FDD_{in}\left(1 - \frac{r_{in}}{r_{out}}\right)}{w \frac{FDD_{in} \cdot r_{in}}{FOD \cdot r_{out}}} = \tan^{-1} \frac{r_{out} \cdot FOD\left(1 - \frac{r_{in}}{r_{out}}\right)}{w \cdot r_{in}}$$

As described above, in this embodiment, an angle β formed between the rotation axis L and the input surface 11a of the radiation camera 4 is set in accordance with the FOD (focus-object distance) which is the distance between the radiation source 2 and the imaging plane P in the object 20. It is obvious that the relationship of angle β=π/2− angle θ holds. Basically, when the enlargement factor multiplies n-fold, the moving speed of an image on the image sensor 13 also multiplies n-fold, and hence the TDI control speed (charge transfer speed) multiplies n-fold. In consideration of a practical enlargement factor, the angle θ needs to be set to 20° to 30°.

Figure 5:
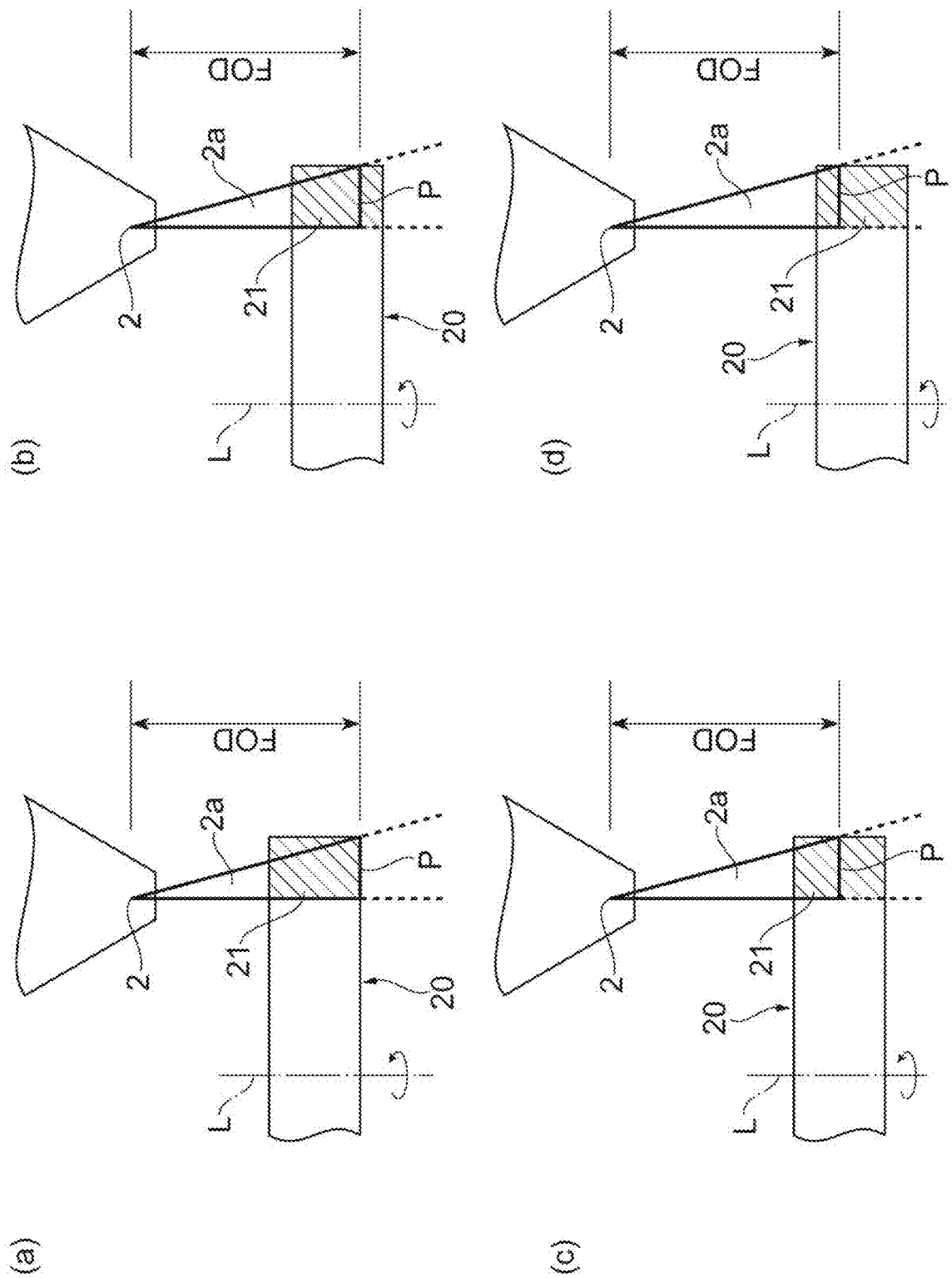
FIGS. 5(a) to 5(d) are views showing the movement of an imaging plane by a stage movement control unit.
Figure 6:
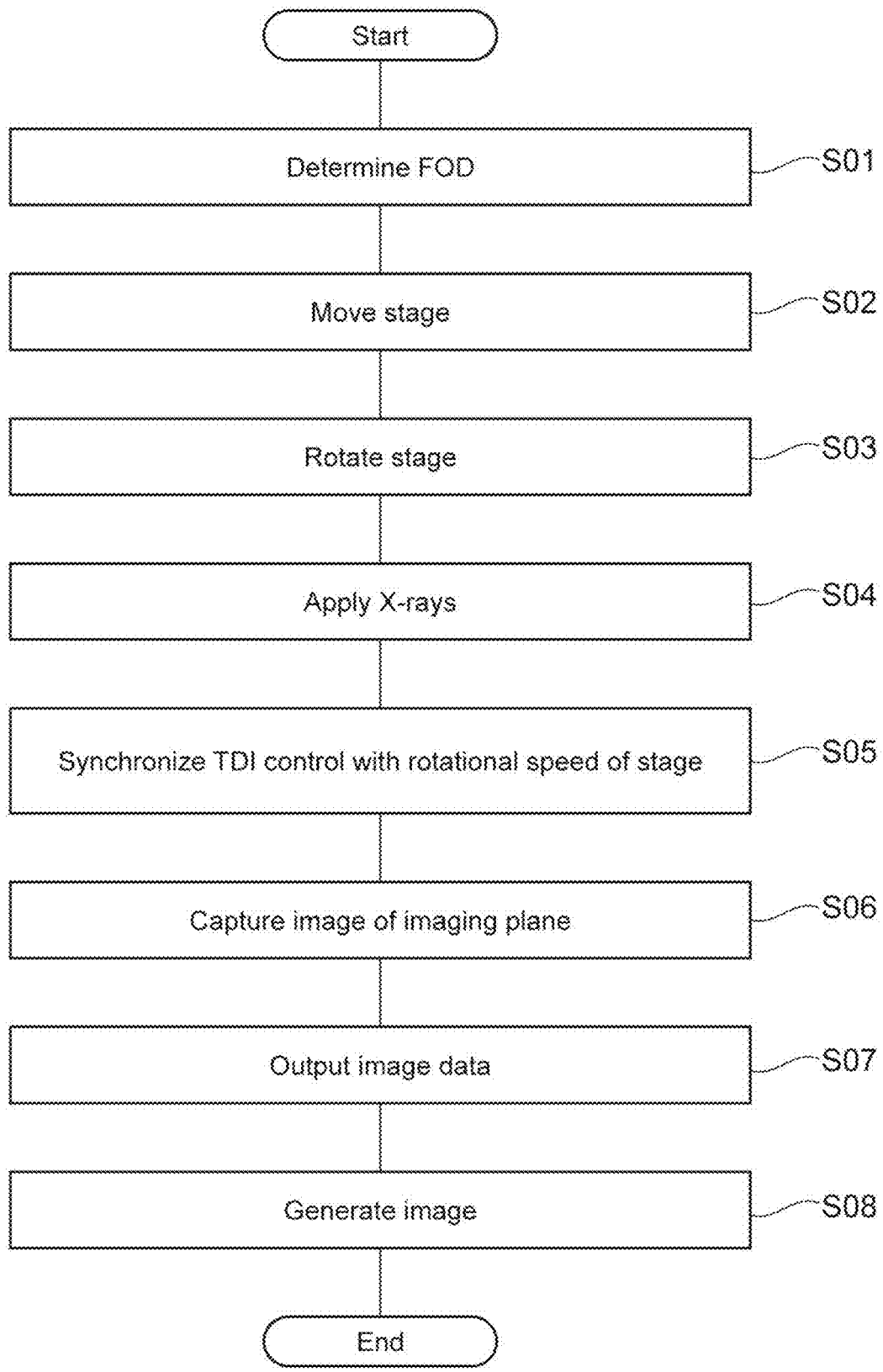
FIG. 6 is a flowchart showing a procedure in an image acquisition method performed by the image acquisition apparatus in FIG. 1.

The operation of the image acquisition system 1, i.e., a method for acquiring a radiographic image, will be described next with reference to FIGS. 5 and 6. First, the object 20 such as a chip capacitor wound in a roll shape is attached to the rotating stage 6 and is held by the rotating stage 6. Next, as shown in FIG. 6, the FOD is determined (Step S01). The FOD can be determined based on a desired enlargement factor.

Next, the stage lifting and lowering control unit 17 drives the stage lifting and lowering machine 7 in accordance with the FOD and moves the rotating stage 6 in the rotation axis L direction (Step S02 (movement step)). Next, the object 20 is rotated about the rotation axis L at a predetermined speed by using the rotating stage 6 (Step S03 (rotation step)). Next, the radiation source 2 outputs/emits radiation toward the rotating object 20 (Step S04 (radiation output step)). The radiation transmitted through the roll portion 21 of the object 20 is input to the input surface 11a.

Next, the radiation camera 4 performs TDI control in the image sensor 13 in synchronization with the rotational speed of the object 20 rotated by the rotating stage 6 (Step S05). That is, the image sensor 13 is driven at a speed synchronous with the rotational speed of the roll. The radiation camera 4 then captures an image of an imaging plane (Step S06) and outputs the image data (Step S07) (Steps S05 to S07 (radiographic image capturing step)). The image processing apparatus 10 receives the image data output from the radiation camera 4 and generates a radiographic image at the imaging plane P of the object 20 (Step S08 (image generation step)).

A radiographic image of the imaging plane P is acquired through the above series of processings. With the image acquisition system 1 and the image acquisition method according to this embodiment, TDI control is performed on the image sensor 13 in synchronization with the rotational speed of the object 20 rotated by the rotating stage 6. The speed of the inner peripheral portion (the portion nearest to the rotation axis) of the imaging plane P of the object 20 is lower than that of the outer peripheral portion (the portion farthest from the rotation axis). The angle β as an acute angle is formed between the rotation axis L of the rotating stage 6 and the input surface 11a of the radiation camera 4. The distance $FDD_{in}$ between the radiation source 2 and a portion of the input surface 11a to which radiation transmitted through the inner peripheral portion is input is longer than the distance $FDD_{out}$ between the radiation source 2 and a portion of the input surface 11a to which radiation transmitted through the outer peripheral portion is input (see FIG. 3). This indicates that the enlargement factor at the inner peripheral portion is larger than that at the outer peripheral portion (see equations (1) and (2)). A conveying speed suitable for a predetermined line speed in TDI control is inversely proportional to an enlargement factor. According to the above magnitude relationship between enlargement factors, the influence of the speed difference between the inner peripheral portion and the outer peripheral portion is reduced. In addition, the angle formed between the rotation axis L of the rotating stage 6 and the input surface 11a of the radiation camera 4 is set in accordance with the FOD as the distance between the radiation source 2 and the imaging plane P in the object 20 to make the ratio between the enlargement factor at the inner peripheral portion and the enlargement factor at the outer peripheral portion become the reciprocal of the speed ratio, thereby achieving focus on the inner peripheral portion and the outer peripheral portion. This makes it possible to achieve focus on any portion between the inner peripheral portion and the outer peripheral portion. It is therefore possible to acquire a sharp radiographic image of any portion of the object 20 in the radial direction.

In this case, the image acquisition method may further include a step of bringing the object 20 closer to or moving it further from the radiation source 2 by controlling the movement of the rotating stage 6 in the rotation axis L direction. For example, after Steps S01 to S08 described above are completed, the object 20 may be moved in the rotation axis L direction (Step S02). As shown in FIG. 5(a), in the first image generation process, the imaging plane P is set near the lower surface of the roll portion 21. Accordingly, as shown in FIG. 5(b), the rotating stage 6 is lowered by a distance corresponding to ¼ (1/n: n is a natural number) of the thickness in the rotation axis L direction. This makes it possible to move the imaging plane P upward from the lower surface of the roll portion 21 by a distance corresponding to about ¼ of the thickness and obtain a sharp radiographic image of the imaging plane P. Likewise, as shown in FIG. 5(c) and FIG. 5(d), the position of the imaging plane P can be raised stepwise by lowering the rotating stage 6.

This step allows the adjustment of the distance between the radiation source 2 and the object 20. In other words, the imaging plane P based on the FOD described above can be set at an arbitrary position on the object 20 in the rotation axis L direction (that is, in the thickness direction). In this case, if the radiation source 2 is immovable, the FOD can be considered constant. It is possible to acquire a radiographic image at an arbitrary position in the object 20 in the thickness direction.

The radiation camera 4 including the scintillator 11 having the input surface 11a and the image sensor 13 that captures an image of scintillation light generated by the scintillator 11 in accordance with the input of radiation can acquire a sharp radiographic image of the object 20.

In the image acquisition method using the image acquisition system 1, for example, the image processing apparatus 10, the timing control unit 16, the stage lifting and lowering control unit 17, and the display device 15 may be set in advance to automatically perform Steps S02 to S08 at the stage where the input of first parameters (the FOD, etc.) has been completed. In addition, after one radiographic image is acquired at a given imaging plane P, the stage lifting and lowering control unit 17 may perform 1/n movement to acquire a radiographic image at the next imaging plane P. Acquiring radiographic images at different positions in the thickness direction in this manner can feed back, for example, information concerning a found foreign substance (for example, positional information in the radial direction or thickness direction) to a manufacturing process.

Figure 7:
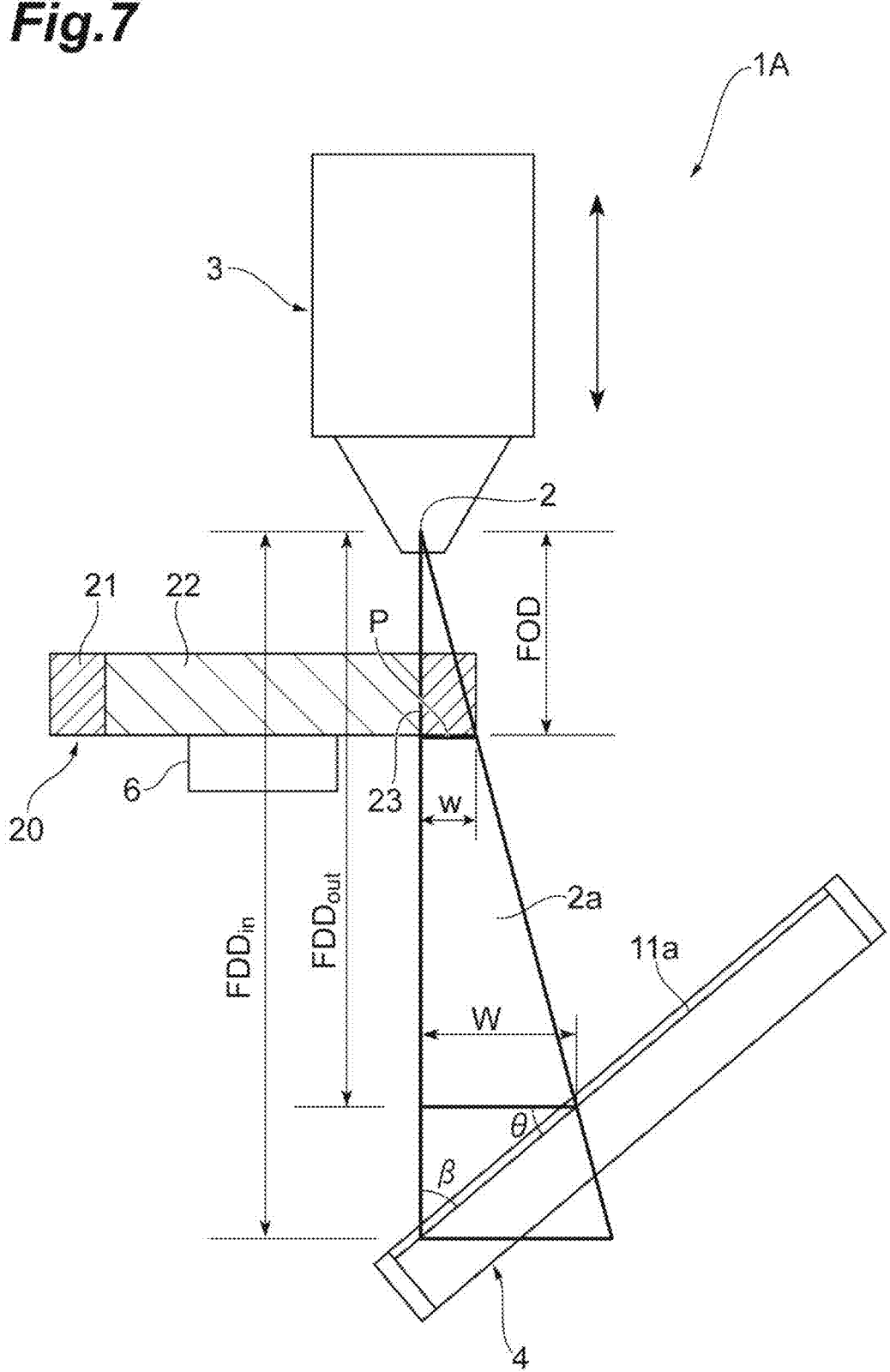
FIG. 7 is a view showing the schematic arrangement of a modification of the first embodiment.

A modification of the first embodiment will be described with reference to FIG. 7. As shown in FIG. 7, the stage lifting and lowering machine 7 and the stage lifting and lowering control unit 17 may be omitted, and an image acquisition system 1A including a mechanism for lifting and lowering (moving in the rotation axis L direction) the radiation generator 3 (the radiation source 2) instead of the omitted components may be provided. FIG. 7 omits the illustration of the lifting and lowering mechanism for the radiation generator 3. FIG. 7 also omits the illustration of the image processing apparatus 10, the display device 15, and the timing control unit 16 (the same applies to FIGS. 10 and 11 described below).

Using the image acquisition system 1A described above makes it also possible to calculate the tilt angle θ of the radiation camera 4 in accordance with the FOD by equation (12) given below.

[Numerical Formula 12]

$$\theta = \tan^{-1}\frac{FDD_{in} - FDD_{out}}{w\frac{FDD_{out}}{FOD}} = \tan^{-1}\frac{FDD_{in}\left(1 - \frac{r_{in}}{r_{out}}\right)}{w\frac{FDD_{in} \cdot r_{in}}{FOD \cdot r_{out}}} = \tan^{-1}\frac{r_{out} \cdot FOD\left(1 - \frac{r_{in}}{r_{out}}\right)}{w \cdot r_{in}} \quad (12)$$

Figure 8:
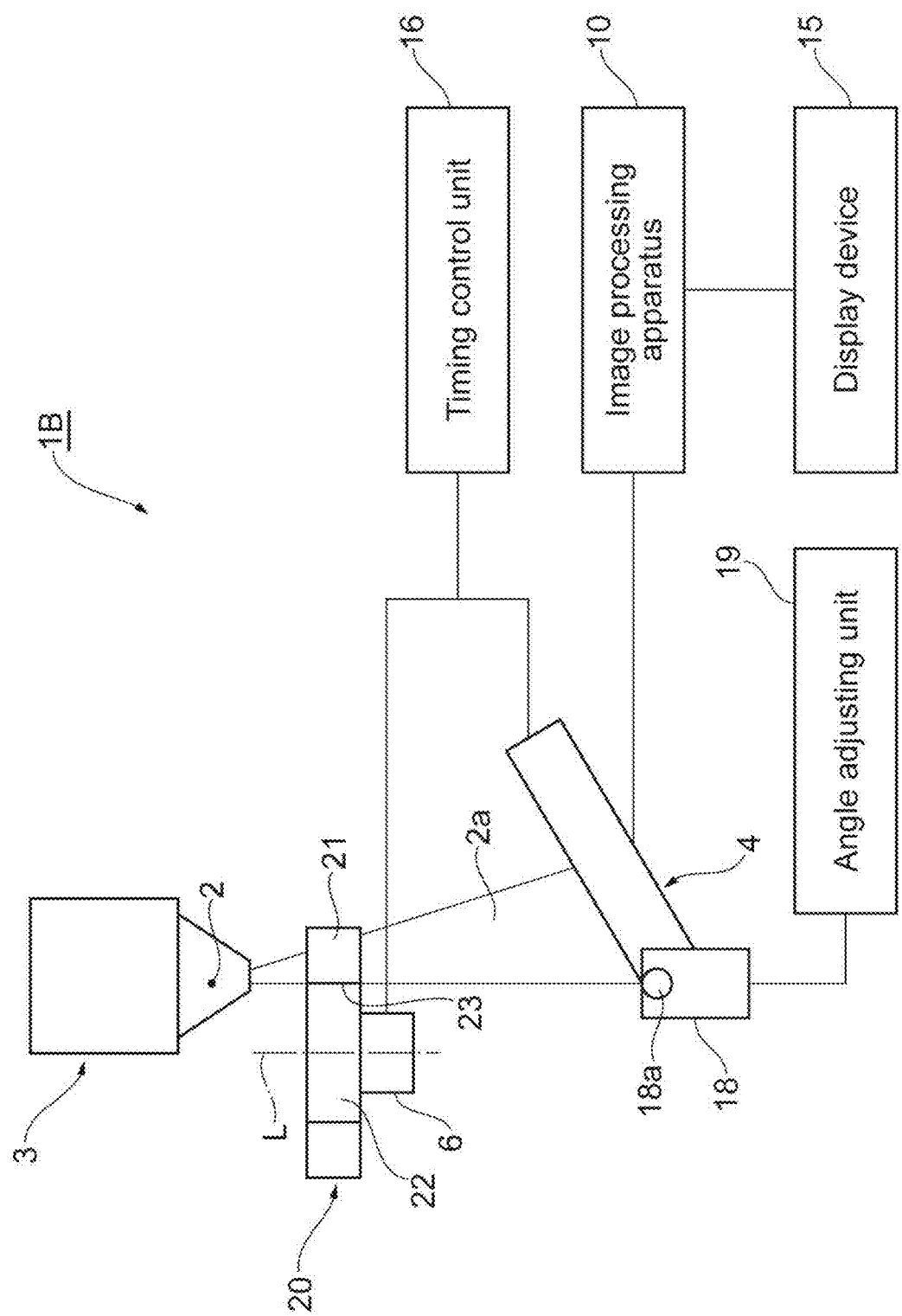
FIG. 8 is a view showing the schematic arrangement of an image acquisition apparatus according to the second embodiment of the present disclosure.

An image acquisition system 1B according to the second embodiment will be described next with reference to FIGS. 8 and 9. The image acquisition system 1B differs from the image acquisition system 1 according to the first embodiment in that the stage lifting and lowering machine 7 and the stage lifting and lowering control unit 17 are omitted, and the apparatus includes, instead of the omitted components, a pivoting mechanism 18 and an angle adjusting unit 19 which are configured to adjust the angle formed between a rotation axis L of a rotating stage 6 and an input surface 11a of a radiation camera 4 by causing the radiation camera 4 to pivot. The pivoting mechanism 18 includes a pivot shaft 18a coupled to the radiation camera 4, and has a motor, gears, etc., (not shown) to cause the radiation camera 4 to pivot. The pivoting mechanism 18 holds the radiation camera 4 so as to tilt the input surface 11a of the radiation camera 4 with respect to the rotation axis L. The pivot shaft 18a of the pivoting mechanism 18 may be vertical to a virtual plane including a rotation axis L and a radiation source 2.

Figure 9:
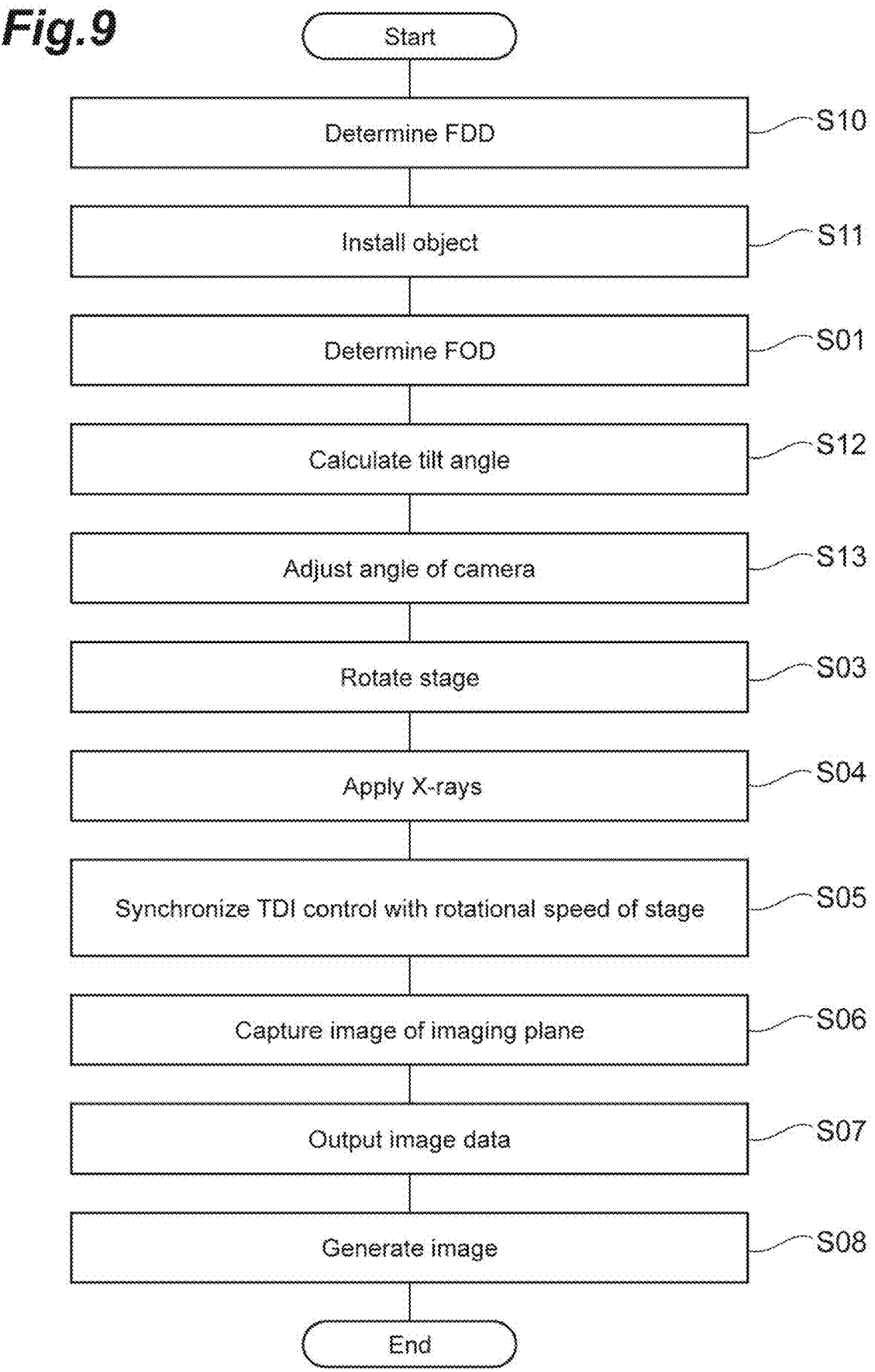
FIG. 9 is a flowchart showing a procedure in an image acquisition method performed by the image acquisition apparatus in FIG. 8.

As shown in FIG. 9, an image acquisition method using the image acquisition system 1B differs from the image acquisition method using the image acquisition system 1 in that the FDD is determined (Step S10) and an object 20 is installed in accordance with the FDD (Step S11) before the determination of the FOD (Step S01), and a tilt angle θ is calculated, after the determination of the FOD (Step S01), based on the FDD, the FOD, and a winding thickness w (see Step S12 and equations (11) and (12)) to cause the angle adjusting unit 19 to control the pivoting mechanism 18 to set the tilt angle θ, thus adjusting the angle of the radiation camera 4 (Step S13 (adjustment step)). The movement of the stage by the image acquisition system 1 (see Step S02 in FIG. 6) is not performed in this embodiment.

Using the image acquisition system 1B makes it also possible to achieve functions and effects similar to those obtained by using the image acquisition systems 1 and 1A. In addition, providing the step of adjusting the angle can properly adjust the angle formed between the rotation axis L of the rotating stage 6 and the input surface 11a of the radiation camera 4 in accordance with the FOD.

In the step of adjusting the angle, the angle formed between the rotation axis L of the rotating stage 6 and the input surface 11a of the radiation camera 4 is adjusted in accordance with the FOD as the distance between the radiation source 2 and the imaging plane P in the object 20, and hence focus can be achieved in accordance with an arbitrary FOD.

In the step of adjusting the angle, because the radiation camera 4 is made to pivot to tilt the input surface 11a of the radiation camera 4 with respect to the rotation axis L, the angle formed between the rotation axis L of the rotating stage 6 and the input surface 11a of the radiation camera 4 can be adjusted to a proper angle in accordance with the FOD by adjusting the posture of the radiation camera 4.

Figure 10:
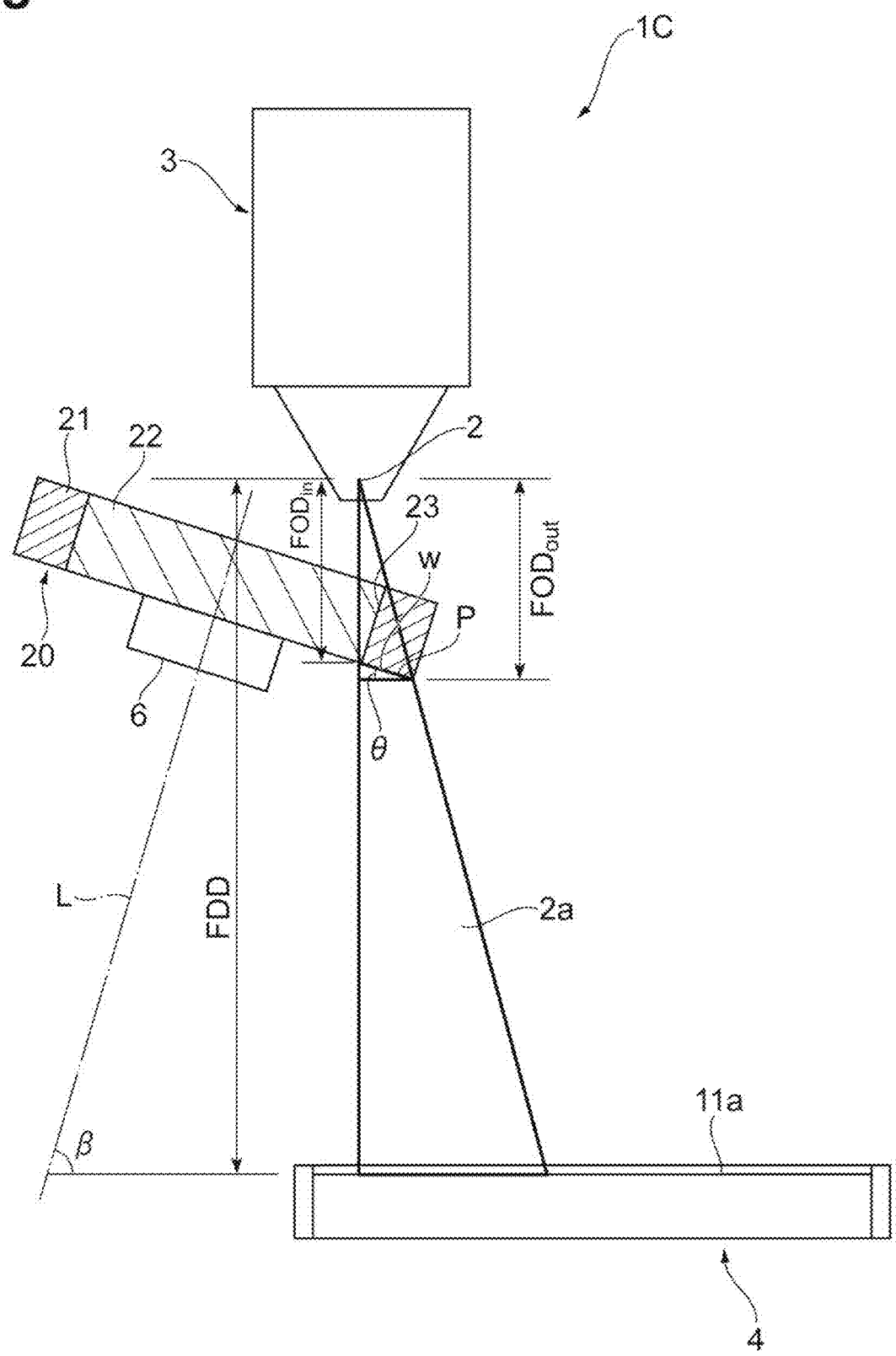
FIG. 10 is a view showing the schematic arrangement of an image acquisition apparatus according to the third embodiment of the present disclosure.
Figure 11:
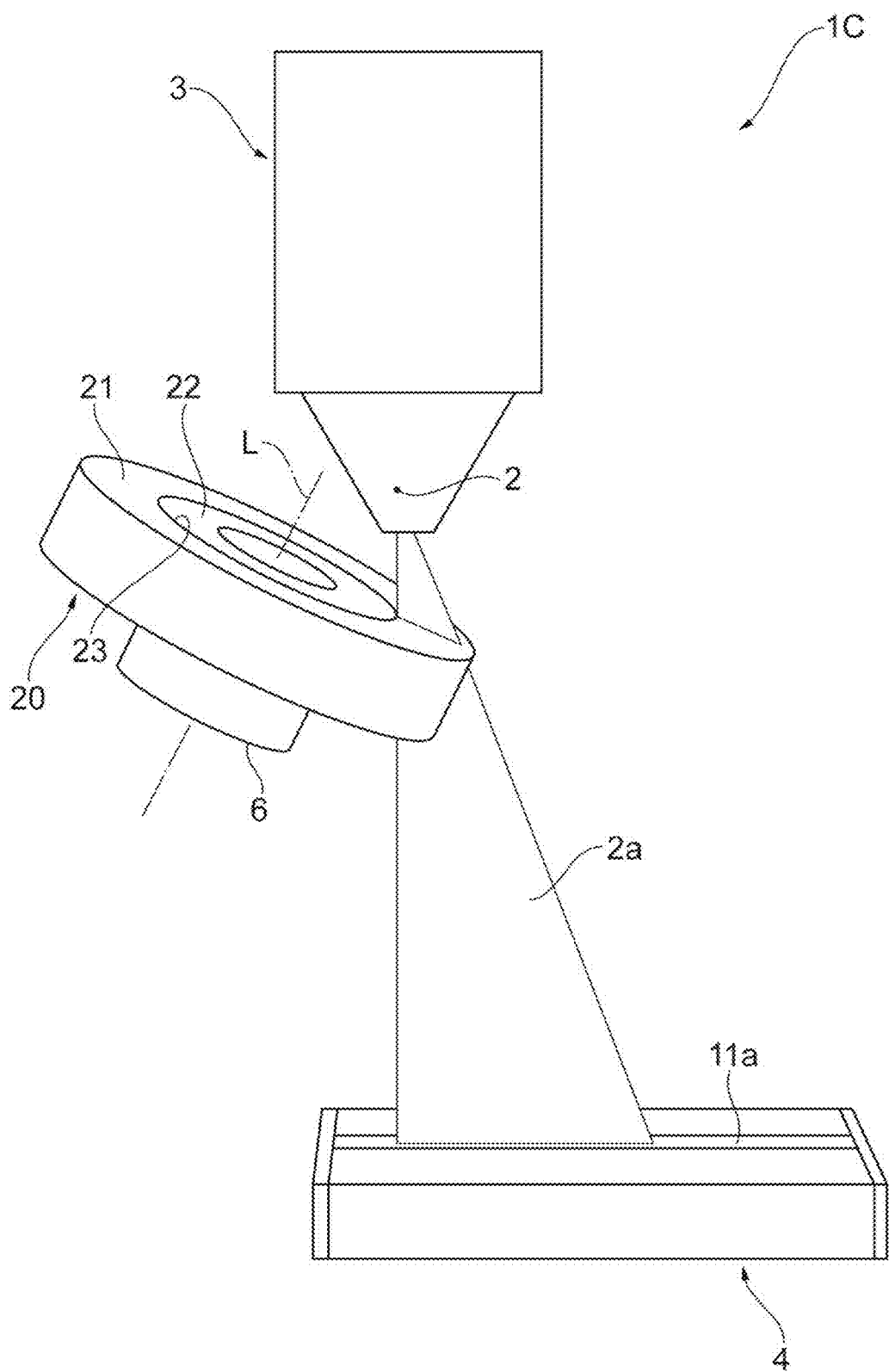
FIG. 11 is a view for explaining the positional relationship between a radiation source, an object, and a radiation camera in the image acquisition apparatus in FIG. 10.

An image acquisition system 1C according to the third embodiment will be described with reference to FIGS. 10 and 11. The image acquisition system 1C differs from the image acquisition system 1 according to the first embodiment in that the stage lifting and lowering machine 7 and the stage lifting and lowering control unit 17 are omitted, a rotating stage 6 and an object 20 are tilted so as not to make an extended plane of a boundary surface 23 pass through a radiation source 2, and a radiation camera 4 is disposed to make an edge (optical axis) of a radiation flux 2a corresponding to the inner peripheral portion of an imaging plane P become orthogonal to an input surface 11a of the radiation camera 4.

The image acquisition system 1C can also achieve effects similar to those represented by equations (1) to (5), and calculates a tilt angle θ of the object 20 according to equation (13) given below. In the image acquisition system 1C, it is obvious that the relationship of angle β=π/2− angle θ holds with respect to the angle β formed between the rotation axis L and the input surface 11a.

[Numerical Formula 13]

$$\theta = \sin^{-1}\frac{FOD_{out} - FOD_{in}}{w} = \sin^{-1}\frac{\left(\frac{r_{out}}{r_{in}} - 1\right)FOD_{in}}{w} \quad (13)$$

Note that mechanisms similar to the pivoting mechanism 18 and the angle adjusting unit 19 of the image acquisition system 1B described above may be applied to the rotating stage 6 of the image acquisition system 1C. In this case, the angle formed between the rotation axis L of the rotating stage 6 and the input surface 11a of the radiation camera 4 can be adjusted to a proper angle in accordance with the FOD by adjusting the posture of the rotating stage 6.

Although the embodiments of the present disclosure have been described above, the present invention is not limited to the above embodiments. For example, the above embodiments each have exemplified the case in which the radiation camera 4 is an indirect conversion type camera including the FOP 12 having the scintillator 11 and coupled to the image sensor 13. However, the radiation camera is not limited to this aspect. For example, the present invention may adopt an indirect conversion type radiation camera including the scintillator 11 coupled to the image sensor 13 with the FOP 12 being omitted. In this case as well, the input surface 11a of the scintillator 11 is the input surface of the radiation camera and serves as the angle reference described above. Alternatively, the present invention may adopt a direct conversion type radiation camera constituted by only the image sensor 13. In this case, the light receiving surface 13a of the image sensor 13 is the input surface of the radiation camera and serves as the angle reference described above. The direct conversion type radiation camera also allows TDI control by the image sensor 13. Alternatively, the present invention may adopt a direct conversion type radiation camera having the FOP coupled to the image sensor 13. In this case, the surface of the FOP is the input surface of the radiation camera and serves as the angle reference described above. Even using these direct conversion type radiation image sensors makes it possible to acquire a sharp radiographic image of an object.

The angle formed between the rotation axis L of the rotating stage 6 and the input surface 11a of the radiation camera 4 may be set in accordance with the FOD and need not be equal to equations (11), (12), and (13). Even if the angle is slightly different from equations (11), (12), and (13), it is possible to acquire sharp radiographic images of any portions in the radial direction. In addition, the present invention is not limited to the image acquisition system in an aspect in which the rotating stage 6 or the radiation camera 4 can pivot, and an image acquisition system in which the rotating stage 6 or the radiation camera 4 is fixed at the angle "set in accordance with the FOD" with subsequent angle adjustment being inhibited may be provided as one aspect of the present invention.

The present invention may adopt an arrangement capable of adjusting both the angles of the rotating stage 6 and the radiation camera 4. Note that when the rotating stage 6 is to be tilted, the radiation camera 4 needs to be tilted more.

An image acquisition system may be provided, which is obtained by combining two or more of the plurality of embodiments described above. For example, an image acquisition system may be provided, which is obtained by combining two or more of the operations of tilting the radiation camera and lifting and lowering the rotating stage 6 in the image acquisition system 1, lifting and lowering the radiation generator 3 in the image acquisition system 1A, making the radiation camera 4 pivot (angle adjustment) in the image acquisition system 1B, and tilting the rotating stage 6 and the object 20 in the image acquisition system 1C.

(Test Example)

Figure 12:
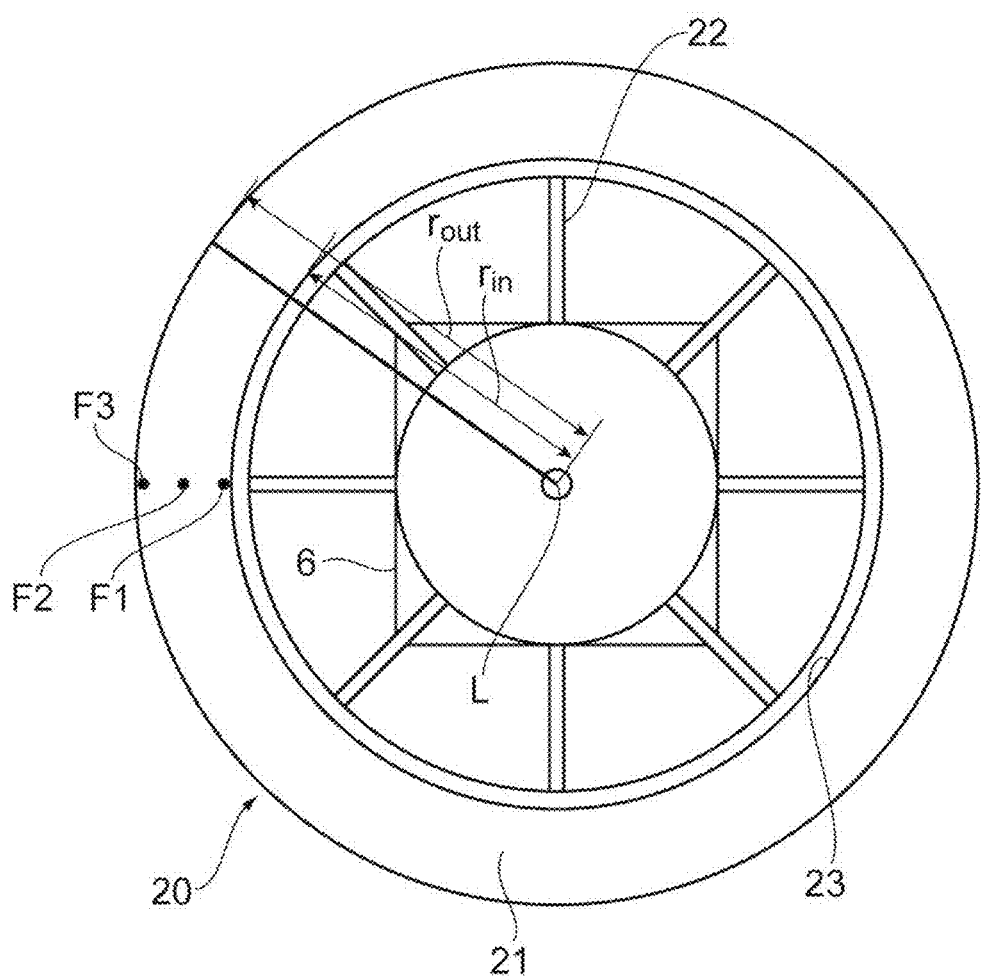
FIG. 12 is a view for explaining conditions for simulation.

A simulation was performed to examine the effects of the image acquisition system 1 according to the first embodiment. It was assumed that the radius of an inner peripheral portion was represented by $r_{in}$=120 mm, and the radius of the outer peripheral portion was represented by $r_{out}$=150 mm. As shown in FIG. 12, with reference to a foreign substance No. 1 (denoted by reference symbol F1) located in the inner peripheral portion, the speed ratio of a foreign substance No. 2 (denoted by reference symbol F2) located in the middle in the winding thickness direction is 1.125, and the speed ratio of a foreign substance No. 3 (denoted by reference symbol F3) located in the outer peripheral portion is 1.25.

Figure 13:
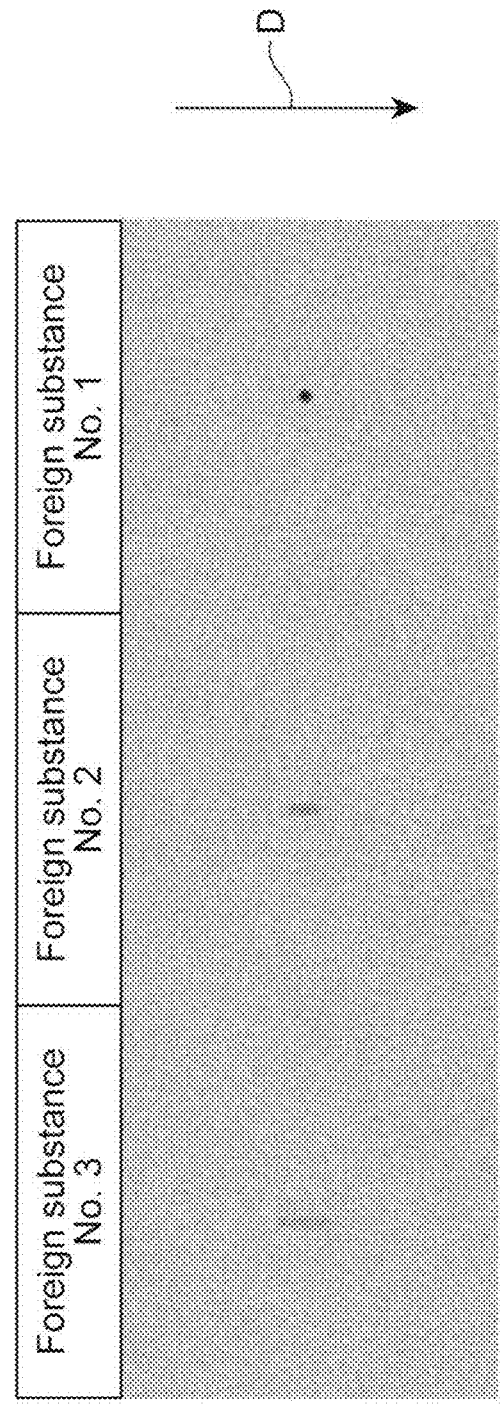
FIG. 13 is a view showing a simulation result according to the first comparative example.
Figure 14:
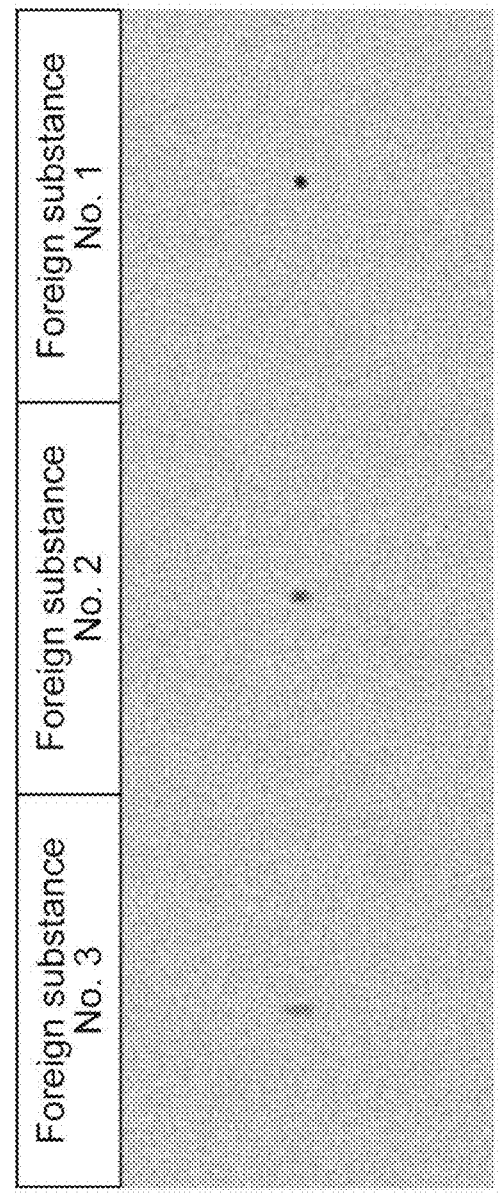
FIG. 14 is a view showing a simulation result according to the second comparative example.
Figure 15:
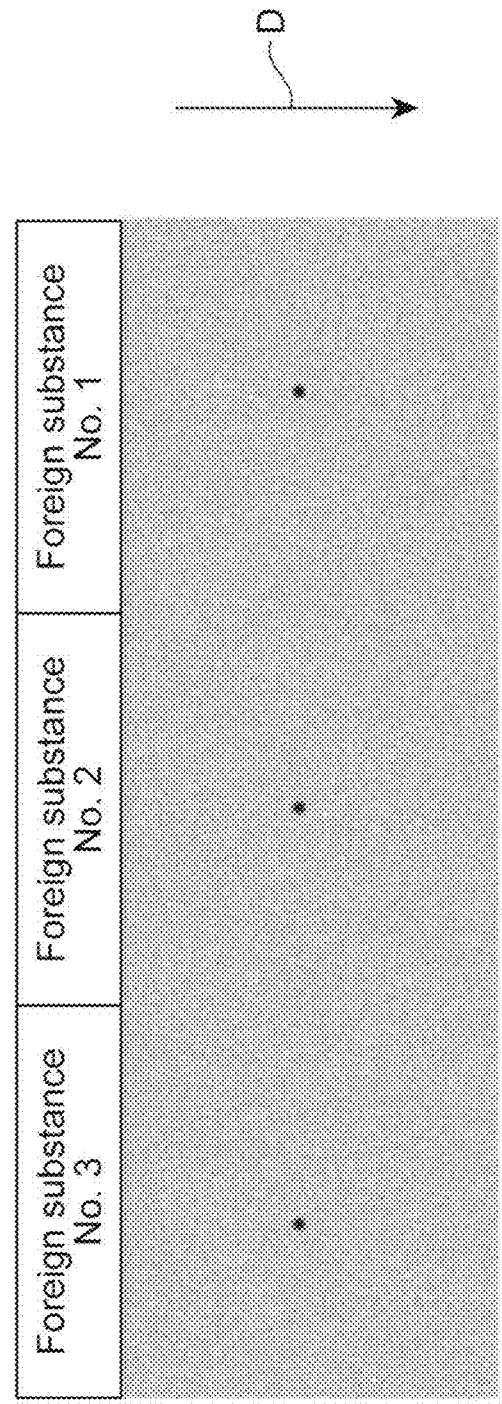
FIG. 15 is a view showing a simulation result according to an embodiment.

In the first comparative example, a simulation was performed under the condition that the radiation camera 4 was not tilted, i.e., the input surface 11a of the radiation camera 4 was orthogonal to the rotation axis L in the image acquisition system 1. In the second comparative example, a simulation was performed under the condition that the radiation camera 4 was tilted to make the input surface 11a of the radiation camera 4 have an acute angle with respect to the rotation axis L, which was about half of a proper angle corresponding to the FOD. In the first and second comparative examples, a TDI transfer speed was set in accordance with the conveying speed of the foreign substance No. 1 in the inner peripheral portion. In an embodiment, a simulation was performed under the condition that the input surface 11a of the radiation camera 4 formed an acute angle with respect to the rotation axis L, which was a proper angle corresponding to the FOD. Note that the tilt angle was about 34° in the embodiment, and the tilt angle was about 17° in the second comparative example. The simulation conditions were FDD: 300 mm, and FOD: 100 mm. FIGS. 13, 14, and 15 respectively show simulation results in the first comparative example, the second comparative example, and the embodiment. Note that in each drawing, a conveying direction D is also written.

As shown in FIG. 13, when the radiation camera 4 was not tilted, a radiographic image of the foreign substance No. 1 was sharp, but images of the foreign substances No. 2 and No. 3 were blurred in the conveying direction D because of the speed difference with respect to the foreign substances No. 2 and No. 3, thus resulting in a deterioration in contrast. In addition, as shown in FIG. 14, even when the radiation camera 4 was tilted but the tilt angle is not proper, images of the foreign substances No. 2 and No. 3 were blurred in the conveying direction D because of the speed difference with respect to the foreign substances No. 2 and No. 3, thus resulting in a deterioration in contrast.

As shown in FIG. 15, when the radiation camera 4 was tilted to set a proper angle corresponding to the FOD, the speed difference (speed ratio) was absorbed, and object images were able to be captured at all positions in the radial direction without blurring.

INDUSTRIAL APPLICABILITY

According to several aspects of the present disclosure, sharp radiographic images of any portions of an object in the radial direction can be acquired.

REFERENCE SIGNS LIST

1 . . . image acquisition system, 2 . . . radiation source, 3 . . . radiation generator, 4 . . . radiation camera, 6 . . . rotating stage, 7 . . . stage lifting and lowering machine, 10 . . . image processing apparatus, 11 . . . scintillator, 11a . . . input surface, 13 . . . image sensor, 13a . . . light receiving surface, 15 . . . display device, 16 . . . timing control unit, 17 . . . stage lifting and lowering control unit (stage movement control unit), 20 . . . object, 21 . . . roll portion, 22 . . . wheel portion, 23 . . . boundary surface, L . . . rotation axis, P . . . imaging plane

The invention claimed is:

1. An image acquisition system comprising:
a radiation source configured to output radiation toward an object;
a rotating stage configured to rotate the object around a rotation axis;
a radiation camera having an input surface to which the radiation transmitted through the object is input and an image sensor capable of TDI (time delay integration) control and configured to capture an image of the input radiation and output image data; and an image processor configured to generate a radiographic image of the object at an imaging plane based on the image data,
wherein the radiation source has an axis that is parallel to the rotation axis,
a first angle formed between the rotation axis of the rotating stage and a plane including the input surface of the radiation camera is an acute angle and is set in accordance with an FOD which is a distance between the radiation source and an imaging plane in the object,
a second angle formed between the axis of the radiation source and the plane including the input surface of the radiation camera is an acute angle, and
the radiation camera is configured to perform TDI control in the image sensor in synchronization with a rotational speed of the object rotated by the rotating stage.

2. The image acquisition system according to claim 1, further comprising a stage movement controller configured to bring the object closer to or move the object further from the radiation source by controlling movement of the rotating stage in the rotation axis direction.

3. The image acquisition system according to claim 1, further comprising an angle adjusting controller configured to hold the rotating stage or the radiation camera and adjust the first angle formed between the rotation axis of the rotating stage and the plane including the input surface of the radiation camera.

4. The image acquisition system according to claim 3, wherein the angle adjusting controller is configured to adjust the first angle formed between the rotation axis of the rotating stage and the plane including the input surface of the radiation camera in accordance with an FOD which is a distance between the radiation source and the imaging plane in the object.

5. The image acquisition system according to claim 3, wherein the angle adjusting controller holds the radiation camera so as to tilt the input surface of the radiation camera with respect to the rotation axis.

6. The image acquisition system according to claim 3, wherein the angle adjusting controller holds the rotating stage so as to tilt the rotation axis with respect to the input surface of the radiation camera.

7. The image acquisition system according to claim 1, wherein the radiation camera includes a scintillator having the input surface, and the image sensor captures an image of scintillation light generated by the scintillator in accordance with input of the radiation.

8. The image acquisition system according to claim 1, wherein the image sensor is a direct conversion type radiation image sensor having the input surface.

9. An image acquisition method comprising:
a rotation step of rotating an object around a rotation axis at a predetermined speed by using a rotating stage;
a radiation output step of outputting radiation from a radiation source toward the rotating object;
a radiation image capturing step of capturing an image of the input radiation and outputting image data by using a radiation camera having an input surface to which the radiation transmitted through the object is input and an image sensor capable of TDI (time delay integration) control; and
an image generation step of generating a radiographic image of the object at an imaging plane based on the image data,
wherein the radiation source has an axis that is parallel to the rotation axis,
a first angle formed between the rotation axis of the rotating stage and a plane including the input surface of the radiation camera is an acute angle and is set in accordance with an FOD which is a distance between the radiation source and an imaging plane in the object,
a second angle formed between the axis of the radiation source and the plane including the input surface of the radiation camera is an acute angle, and
in the radiation image capturing step, TDI control in the image sensor is performed in synchronization with a rotational speed of the object rotated by the rotating stage.

10. The image acquisition method according to claim 9, further comprising a movement step of bringing the object closer to or moving the object further from the radiation source by controlling movement of the rotating stage in the rotation axis direction.

11. The image acquisition method according to claim 9, further comprising an adjusting step of adjusting the first angle formed between the rotation axis of the rotating stage and the plane including the input surface of the radiation camera by causing the rotating stage or the radiation camera to pivot.

12. The image acquisition method according to claim 11, wherein in the adjusting step, the first angle formed between the rotation axis of the rotating stage and the plane including the input surface of the radiation camera is adjusted in accordance with an FOD which is a distance between the radiation source and an imaging plane in the object.

13. The image acquisition method according to claim 11, wherein in the adjusting step, the radiation camera is caused to pivot to tilt the input surface of the radiation camera with respect to the rotation axis.

14. The image acquisition method according to claim 11, wherein in the adjusting step, the rotating stage is caused to pivot to tilt the rotation axis with respect to the input surface of the radiation camera.

15. The image acquisition method according to claim 9, wherein the radiation camera includes a scintillator having the input surface, and in the radiation image capturing step, an image of scintillation light generated by the scintillator in accordance with input of the radiation is captured.

16. The image acquisition method according to claim 9, wherein the image sensor is a direct conversion type radiation image sensor having the input surface.

* * * * *